(12) United States Patent
LaSala (10) Patent No.: US 9,254,430 B2
(45) Date of Patent: Feb. 9, 2016

(54) GOLF BACKSWING TRAINING AID AND ALERT

(71) Applicant: Anthony LaSala, West Hartford, CT (US)

(72) Inventor: Anthony LaSala, West Hartford, CT (US)

(*) Notice: Subject to any disclaimer, the term of this patent is extended or adjusted under 35 U.S.C. 154(b) by 37 days.

(21) Appl. No.: 14/244,249

(22) Filed: Apr. 3, 2014

(65) Prior Publication Data
US 2015/0283448 A1    Oct. 8, 2015

(51) Int. Cl.
*A63B 69/36*    (2006.01)

(52) U.S. Cl.
CPC ......... *A63B 69/3608* (2013.01); *A63B 2220/40* (2013.01); *A63B 2220/801* (2013.01)

(58) Field of Classification Search
CPC .............. A63B 69/36; A63B 69/3608; A63B 2220/40; A63B 2220/801
USPC ........................................................ 473/207
See application file for complete search history.

(56) References Cited

U.S. PATENT DOCUMENTS

| | | | |
|---|---|---|---|
| 3,362,023 A | 1/1968 | McMahon | |
| 3,940,144 A | 2/1976 | Dickie | |
| 3,985,364 A | 10/1976 | Brady | |
| 4,502,035 A | 2/1985 | Obenauf et al. | |
| 4,651,994 A | 3/1987 | Lee | |
| 4,667,188 A | 5/1987 | Schwartz | |
| 5,067,717 A * | 11/1991 | Harlan | A63B 24/0006 473/207 |
| 5,188,365 A | 2/1993 | Picard | |
| 5,588,919 A * | 12/1996 | Nakamura | A63B 69/3608 473/212 |
| 5,704,846 A * | 1/1998 | Johnson | A63B 69/0059 273/DIG. 30 |
| 5,707,300 A | 1/1998 | May et al. | |
| 5,826,578 A | 10/1998 | Curchod | |
| 6,001,023 A | 12/1999 | Sanchez et al. | |
| 6,024,656 A | 2/2000 | Lane | |
| 6,672,973 B1 | 1/2004 | Muntz | |
| 6,730,047 B2 | 5/2004 | Socci et al. | |
| 7,033,281 B2 * | 4/2006 | Carnahan | A61B 5/4528 434/247 |
| 7,602,301 B1 | 10/2009 | Stirling et al. | |
| 7,645,198 B2 | 1/2010 | Van Heerden | |
| 7,662,048 B2 | 2/2010 | Libby et al. | |
| 7,821,407 B2 | 10/2010 | Shears et al. | |
| 7,825,815 B2 | 11/2010 | Shears et al. | |
| 7,978,081 B2 | 7/2011 | Shears et al. | |
| 8,043,173 B2 * | 10/2011 | Menalagha | A63B 71/0622 473/450 |
| 8,152,650 B1 | 4/2012 | Brandt | |
| 2015/0148143 A1 * | 5/2015 | Asedo | A63B 69/3608 473/216 |

OTHER PUBLICATIONS

M. Somjarod et al., "The Analysis of Knee Joint Movement During Golf Swing in Professional and Amateur Golfers", World Academy of Science, Engineering and Technology, vol. 5, May 22, 2011, pp. 495-498.

B. Hogan, "Five Lessons the Modern Fundamentals of Golf", pp. 65 and 74-75, 1957.

(Continued)

*Primary Examiner* — Raleigh W Chiu
(74) *Attorney, Agent, or Firm* — McCarter & English, LLP (57) ABSTRACT

A golf training aid is provided that teaches a golfer the proper motion of the lead knee during a backswing by providing the golfer with a positive feedback alert. A motion sensor detects a predetermined optimal position of the lead knee and a positive feedback alert is produced when the predetermined optimal position is achieve. The positive feedback alert may be an audible, visual, and/or tactile alert to notify a user that the predetermined optimal position is achieved.

22 Claims, 6 Drawing Sheets

(56) References Cited

OTHER PUBLICATIONS

T.P. Jorgensen, "The Physics of Golf", second edition, p. 54 and 57-58, 1999.
britishgolfmuseum, Screen shot of "Walter Hagen 1928, Lessons from History" YouTube Video, Mar. 29, 2012, https://www.youtube.com/watch?v=RL2J-7jLcOQ.
Braithwaite78, Screen shot of "Ben Hogan Golf Swing" YouTube Video, Jul. 17, 2007, https://www.youtube.com/watch?v=QL_6M_xZvq0.
PraxisMally, Screen shot of "Golf Physio Trainer" YouTube Video, May 25, 2008, https://www.youtube.com/watch?v=96i8TNOJRh8.
ibagtard, Screen shot of "Tiger Woods Driver Slo-Mo", YouTube Video Jun. 28, 2007, https://www.youtube.com/watch?v=dlYMctN356U.
nicklauscom, Screen shot of "Nicklaus Golf My Way—One Basic Swing", YouTube Video Aug. 28, 2007, https://www.youtube.com/watch?v=4smKlu2uARU.
waynedefrancesco.com, Screen shot of "Legends of Golf Bobby Jones", Aug. 17, 2011, http://waynedefrancesco.com/bobby-jones/.
J. Maddalozzo, "An anatomical and biomechanical analysis of the full golf swing", NSCA Journal, vol. 9, Nov. 4, 1987, pp. 6-8 and 77-79.

* cited by examiner

GOLF BACKSWING TRAINING AID AND ALERT

FIELD OF THE INVENTION

The present invention relates to golf practice devices and in particular to the practice of golf swings.

BACKGROUND INFORMATION

It is generally accepted that a proper backswing begins with a golfer gripping a golf club and placing the club directly behind the golf ball or "target." The golfer is now positioned at "address," i.e., in a ready and balanced stance with both knees slightly flexed and with the golfer's weight evenly distributed between the balls of both feet. The golf club then is taken away in a slow, continuous movement where the arms and shoulders move the golf club first away from the ball and then up and around the axis of the spine. As the shoulders rotate, they pull on the hips to rotate, away from the target.

Also during the backswing, the golfer's lead knee (left knee for a right-handed golfer) flexes, and moves slightly forward and then moves downward toward the trailing foot (right foot for a right-handed golfer). However, few modern day golf instructors concentrate on the importance of the correct movement of the lead knee during medium to full swings of a golf club. In the "Five Lessons: The Fundamentals of Golf," for example, Ben Hogan devotes only three short sentences about the movement of the lead knee during the backswing. The lead knee position at the end of the golfer's backswing, if done properly, results in an optimal upper body rotation around a stable trailing leg (right leg for a right-handed golfer). A powerful and controlled backswing, precise golf ball compression, and an accurate golf shot may be achieved. Conversely, abnormal lead knee motion during the backswing can result in injury and many serious errors that produce errant golf shots and frustration.

Prior solutions to train golfers have claimed to teach the correct backswing during medium and full swings of the golf club. These devices claim to teach prevention of reverse pivoting, excessive dipping of the knees, lateral swaying, over rotation of the spine, and the straightening of the knees during the backswing, each by means of a negative feedback alert.

However, the present inventor has recognized that previous training devices are deficient. There remains a need for improved training devices.

SUMMARY OF THE INVENTION

A golf swing practice device that is attachable to a golfer's leg above the lead knee, e.g., by way of an adjustable and/or elastic strap. This device, by way of a positive feedback signal, alerts the golfer when the lead knee has moved to an optimal position during the backswing.

The golf training aid and alert teaches optimal lead knee motion in the backswing during medium and full swings of a golf club by providing positive feedback to a user. Advantageously, embodiments disclosed herein provide training for making better golf shots, reduce the frustration of a golfer, and prevent injury to a golfer. Embodiments disclosed herein provide a simple, convenient, and lightweight teaching aid and alert that a golfer can use on a practice range or at home. The device may fit all golfers' physiques and be useful at all skill levels. The device may be easily donned and removed and provide a positive feedback mechanism to alert the golfer when the lead knee has moved through an optimal motion or moved to an optimal position during the backswing.

In some embodiments, the golf training aid includes a support, and an alerting device, which in some embodiments is a motion-sensing device, mounted on the support that includes a motion sensor and a positive feedback device. The support and motion-sensing device are attachable to the leg of a user by an attachment device. The motion sensor of the motion-sensing device is configured to detect a motion of a user's knee during a golf swing by the user, and, when a predetermined position of the user's knee is reached, activates the positive feedback device and generates a positive feedback alert to the user.

Advantageously, one or more drawbacks and/or disadvantages of previously-known devices may be overcome by the golf-training device disclosed herein. The present invention, unlike previously-known devices that utilize only negative feedback, provides a positive feedback alert, such as audible, visual, and/or tactile alerts, to signal to a user when the lead knee has reached an optimal position at the end of the backswing during medium and full golf swings. Further, unlike prior devices, the present invention, in various embodiments, employs motion sensing devices to detect the lead knee's optimal motion during a backswing when a threshold motion or position has been reached by the lead knee. Thus, the present invention satisfies a need for a portable golf training device that alerts the golfer with a positive feedback signal when the lead knee moves correctly and has reached an optimal position in the backswing, and helps eliminate abnormal lead knee motion and/or injury and resultant errant and frustrating golf shots.

These and other advantages of the invention will become more readily apparent in view of the following detailed description of certain embodiments and accompanying drawings.

DETAILED DESCRIPTION OF EMBODIMENTS OF THE INVENTION

The present inventor has discovered that videos of many "legends" of golf, including Bobby Jones, Walter Hagan, Jack Nicklaus, and Tiger Woods, reveal that the optimal lead knee motion during the backswing is consistent. These videos show, in the inventor's analysis, that, after starting the backswing, the lead knee moves slightly forward toward the golf ball, then down, and finally toward the trailing foot or leg (right foot for a right-handed golfer), before the knee reaches an optimal position at the end of the backswing, and before the downswing begins.

More specifically, as the golf club, arms, shoulders, and hips rotate and the golfer turns onto and over the trailing leg, the golfer's lead knee flexes and moves forward. As the hips continue to rotate, the lead knee now moves downward and then internally rotates and glides toward the trailing foot. At this point, the golfer's center of gravity has moved from the balls of both feet toward the inside of the trailing foot. To allow this to happen, the trailing leg must remain stable with its knee remaining in a slightly flexed position. During the backswing, the lead foot's heel should remain planted on the ground. The final position of the lead knee's travel depends on several factors including the length of the backswing and the golfer's flexibility and comfort.

In all, a proper backswing during medium and full golf swings includes the lead knee having three distinct movements before attaining an optimal position. First, the knee will flex 20°-30° causing it to move forward approximately two to four inches. Secondly, the knee then moves downward one half to two inches. Finally, because of hip rotation during the backswing, the lead knee internally rotates between −15° and −30° and moves toward the trailing foot. The present inventor developed the disclosed device and method to help achieve this proper backswing by alerting the golfer when the lead knee reaches its optimal position.

Abnormal lead knee motion can occur during reverse pivoting where the lead knee moves toward the target during the backswing instead of down, forward, and finally towards the trailing foot. Abnormal lead knee motion also occurs during excessive lead knee dipping where the lead knee flexes excessively and fails to move toward the trailing foot. Finally, abnormal lead knee motion can occur in lateral swaying where the lead knee fails to move forward and down but slides excessively toward the trailing foot, moving the center of gravity beyond the inside of the trailing foot.

Figure 1:
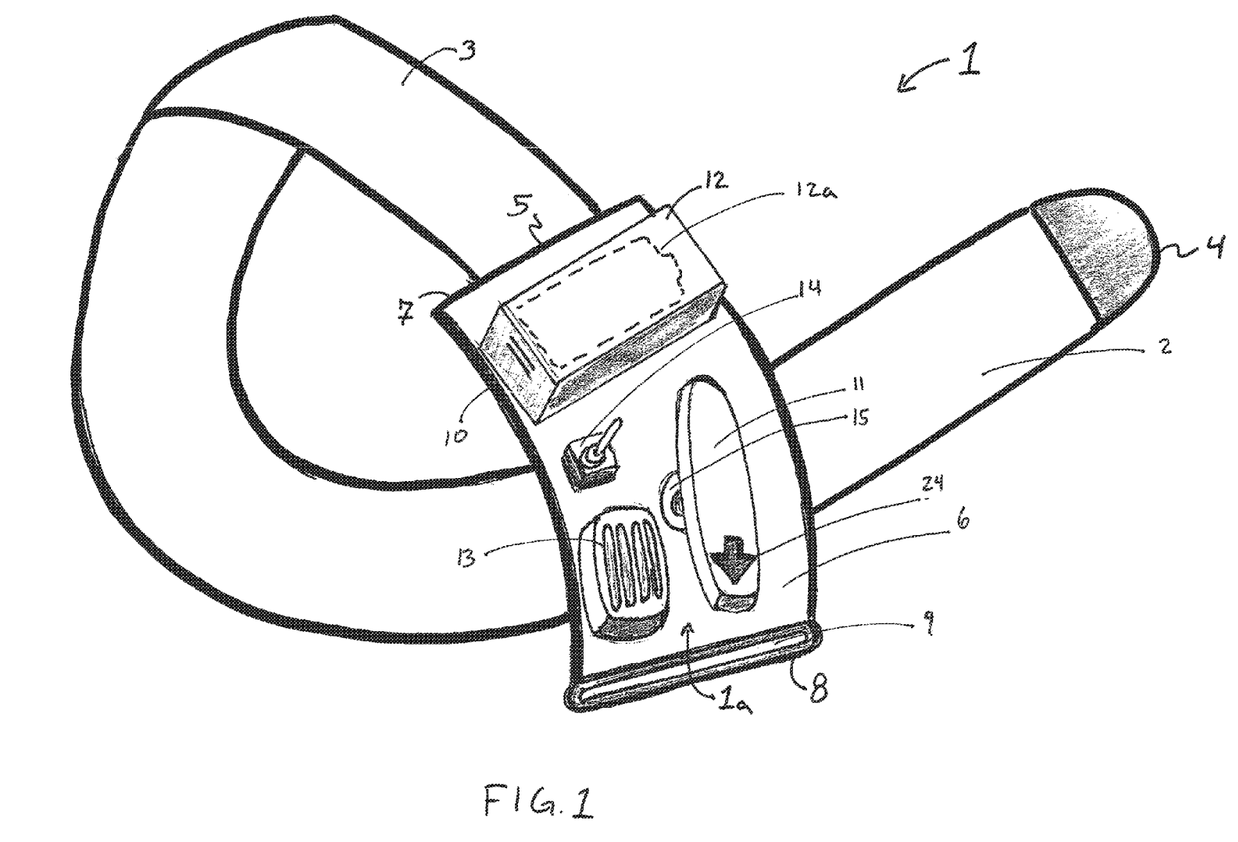
FIG. 1 shows a schematic view of a golf training device.

Referring now to FIG. 1, an exemplary embodiment of a golf training device 1 configured to be worn by a user is shown. As shown in FIG. 1, the golf training device 1 has three general parts. The first is an attachment device 2, in this embodiment a strap, for example made from cloth and/or elastic material. The top surface 3 of the strap 2 is covered with a loop portion of a hook and looped material, such as Velcro™, except for a first end portion 4 of the strap 2, such as the last two inches of the strap 2, which may be covered with a hook material of the hook and looped material. A second end portion 5 of the strap 2 is attached to a side of a support plate 6, described further below. The strap 2 is of sufficient length to accommodate a golfer's lead leg when attached or equipped thereto, and due to the elasticity of the strap 2, the strap 2 may be expanded in length to accommodate various sizes of users' legs.

Although described as a Velcro™ strap, the attachment device 2 can be any type of suitable mechanism for attaching to a person's leg. As will be appreciated by those of ordinary skill in the art, the attachment device 2 can be made of any suitable material, and secure the training device 1 to the user's leg by any suitable appliance, e.g., buckle, clamp, bar and hole, laced ties, snap-fit buckle, slide, or other type of connector.

The second part of the golf training device 1 is the support plate 6. The support plate 6 may be curved and/or flexible to accommodate the contour of a golfer's leg, and, for example, be made from a plastic material, which is lightweight, durable, and slightly flexible. The undersurface of the support plate 6 may be curved in a manner so as to afford comfort when worn by a user and placed approximately one inch above the lead knee. As shown, the support plate 6 is rectangular in shape with measurements of approximately three inches in width, approximately five inches in length, and approximately one quarter of an inch in thickness. These are an exemplary shape and dimensions, and those skilled in the art will appreciate that the support plate may have other suitable shapes and/or dimensions.

A first end 7 of the support plate 6 is affixed to the second end portion 5 of strap 2. A second end 8 of the support plate 6, as shown, defines a narrow slot 9 through which the free end 4 of the strap 2 may be pulled through to secure the support plate 6 to the golfer's lead leg. The undersurface of the support plate 6 may be covered with a soft rubberized material 10 to afford further comfort and friction so that the support plate 6 remains stable while worn by a user during a golf swing.

The third part of the golf training device 1 is an alerting device 1a that includes various electrical components mounted on and/or in the support plate 6, and described further below. The electrical components include a motion sensing device such as a motion sensor 11 utilizing, for example, a threshold motion detector, and a positive feedback device 13, providing, for example, an audio, visual, and/or tactile alert. Also on the support plate are a power source housing 12 and an electrical power source 12a therein, such as a battery or other electrical power source, an ON/OFF switch 14 configured to selectively place the power source 12a in electrical communication with the other electrical components. As shown in FIG. 1, the motion sensor 11 is pivotally mounted on the support plate 6 by the pivot support 15. As shown, an arrow 24, or other indicator, is positioned on one end of the motion sensor 11, to indicate a position or end of the motion sensor 11, as described further below.

Figure 2:
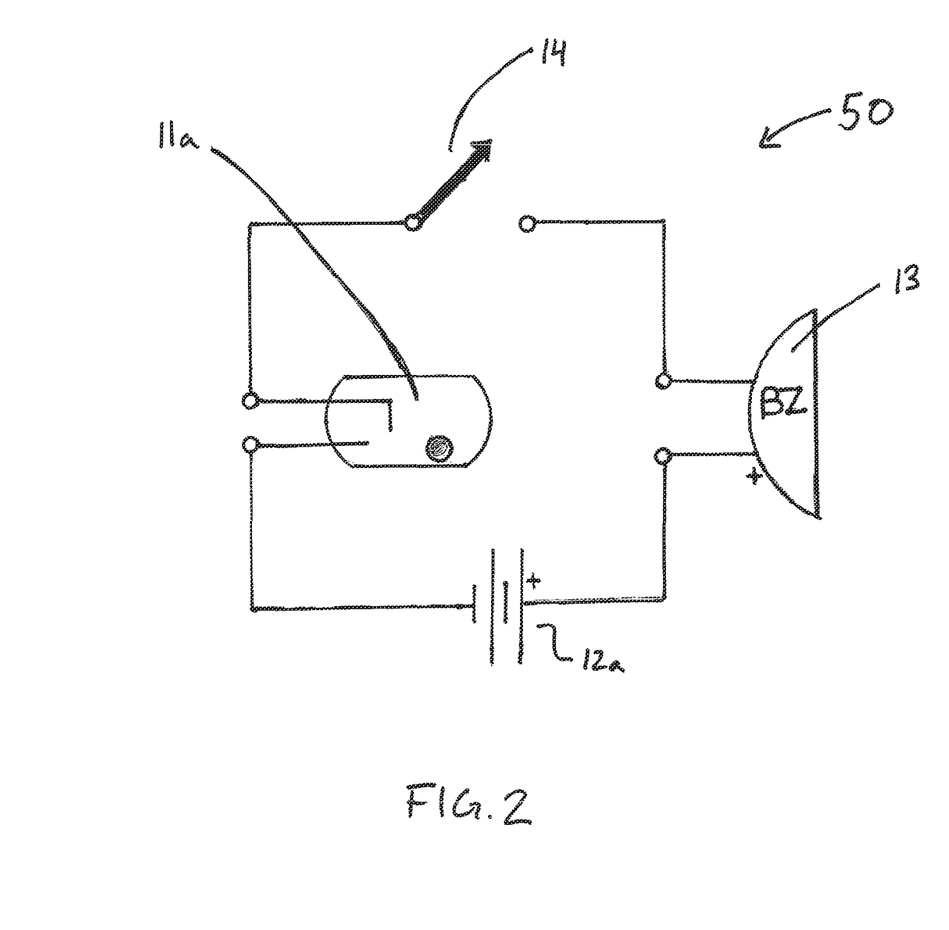
FIG. 2 shows a schematic circuit diagram of a golf training device.

FIG. 2 schematically shows an electrical circuit 50 of a golf training device. A tilt switch 11a, which is part of the motion sensor 11, is positioned in series with the power source 12a, such as a battery housed in the power source housing 12, an ON/OFF switch 14, and a positive feedback alarm or device 13. Though the power source has been described as a battery, which could be disposable/replaceable and/or rechargeable batteries, any other adequate power or energy source, e.g., capacitors, solar power, plug-in, etc., may be used as should be appreciated by those of ordinary skill in the art.

In various embodiments, the generated positive feedback alarm 13 may be visual, audible, or tactile in nature, or combinations thereof, so as to afford positive feedback when the motion sensor 11 detects a threshold motion or position of a golfer's lead knee during the backswing when the lead knee reaches an optimal position. Accordingly, the golf training device may include an LCD or other optical/visual indicator, such as an LED light or screen, other forms of lights, one or more speakers or other type of audible indicator(s), and/or a vibration motor or other tactile indicator to notify a user when an optimal position has been achieved. In the illustrated embodiment, the alarm 13 is a speaker. In other embodiments having multiple modes of alarm, which alert or alerts are activated may be selected by the user.

The tilt switch 11a may be a switch formed from a conductive substance, conductive roller balls and electrical contacts, as described below, or some other form of tilt switch, such as gyro-inertial sensors, opto-kinetic systems, or accelerometers/microprocessors, and/or combinations thereof. Closing or continuity of the circuit 50 shown in FIG. 2 is obtained when the tilt switch 11a, acted upon by gravitational or inertial forces generated by the proper motion of the lead knee during the backswing, makes contact with the electrodes (as described below) and the ON/OFF switch 14 is in the ON position. The tilt switch 11a is designed to be activated by the above forces when a threshold motion or position is reached or crossed, thereby completing the circuit 50, thereby delivering electrical current to and activating the positive feedback alarm 13. Electrical circuit 50 may be formed with wires and/or a printed circuitry, or may be formed from other types of electrical circuitry.

Figure 3:
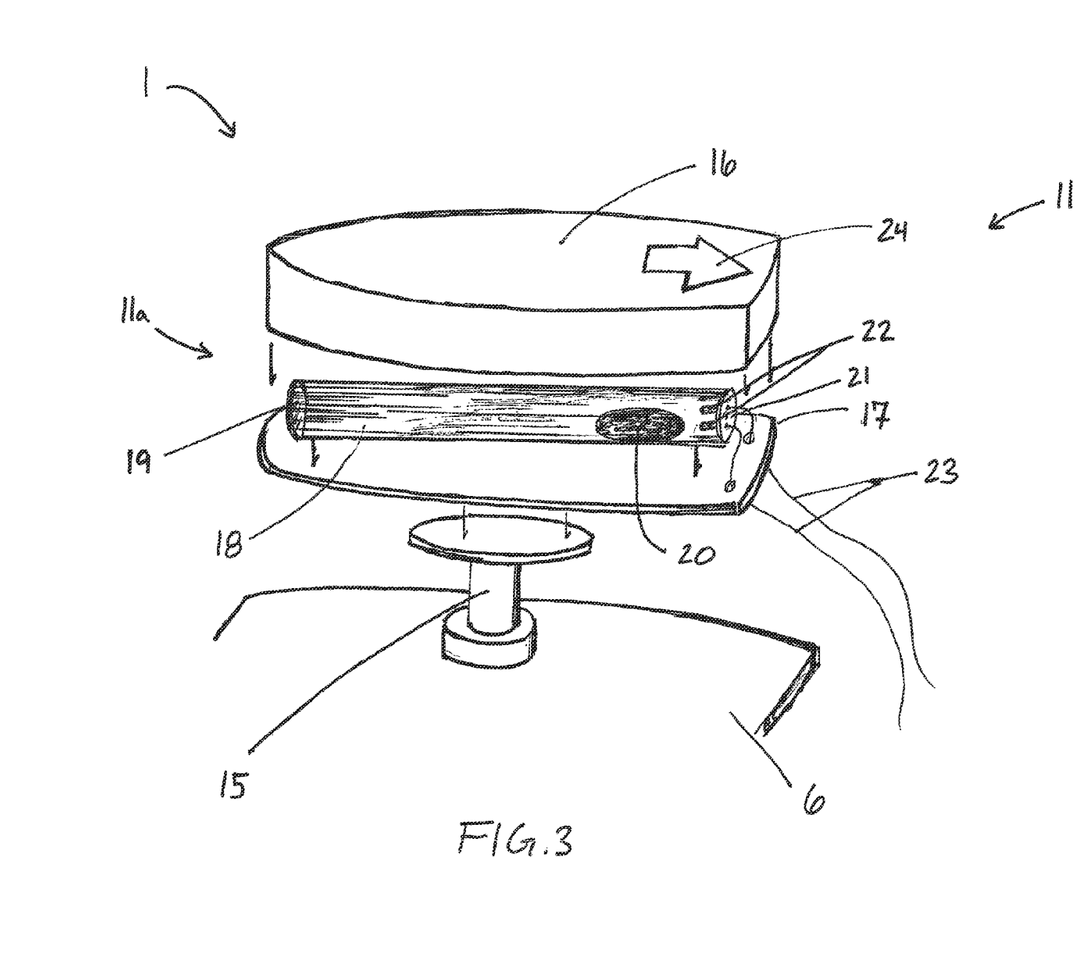
FIG. 3 shows an exploded view of the golf training device of FIG. 1.

Turning to FIG. 3, an exploded view of a golf training device 1 is shown. The motion sensor 11, of the alerting device, is pivotally supported by the pivot support 15 and attached to the support plate 6. The pivot support 15, as shown, is formed with a pivoting ball mounted in a socket, however, other forms of pivotal support or connection may be employed with the golf training device 1. As shown, a top encasement 16 of the motion sensor 11 is separated from a base 17, for explanatory purposes only, and contains the tilt switch 11*a*. The top encasement 16 includes a directional arrow 24. Attached to or mounted on the base 17 is a tube 18, or other tube like structure, made of glass or similar material that is sealed at one end by a plug 19, which may be formed from plastic or rubber, or other sealing material. Contained within the tube 18 is a conductive substance 20, such as a mercuroid or similar substance, approximately two cubic centimeters in volume, which is free to move within the tube 18 according to the gravitational and/or inertial forces placed upon it. In this embodiment, the tube 18 and conductive substance 20 form the tilt switch of the electrical circuit shown in FIG. 2.

The opposite end of the tube 18 is sealed by a plug 21 that seals the tube 18, and may be formed from plastic or rubber, or other sealing material. Centrally located within plug 21 are two metallic contact electrodes 22. The electrodes 22 are connected by way of insulated wires 23 and electrically connected to the power source 12*a* and to the additional circuitry shown in FIG. 2, which may be located in and/or on support plate 6. The conductive substance 20 moves within the tube 18 and can make contact with the electrodes 22 in response to movement of user's knee when the golf training device 1 is worn. When the conductive substance 20 contacts the electrodes 22, and the device 1 is set in the ON position, the electrical power circuit with the power source 12 is completed. The completion of the electrical circuit 50 permits electrical current to flow to feedback device 13, and thus activates the positive feedback alarm 13 to generate a positive feedback alert.

Those of skill in the art will appreciate that other types or materials or configurations of the motion sensor 11 may be used. For example, the tube like structure may be formed from glass, plastics, composites, metals, or combinations thereof. Further, the plugs may be formed from plastics, rubbers, composites, metals, combinations thereof, or may not be present, wherein the tube like structure is uniform and formed as a single piece at one or both ends, which may be rounded, squared, or have other configurations. Moreover, when plugs are used in the tube, they may form permanent, semi-permanent, or non-permanent seals. For example, the plugs may be pressurized into the ends of the tube, they may be glued, fused, mechanically attached, or otherwise attached at the end(s) of the tube, to thereby seal a conductive material therein.

Figure 4:
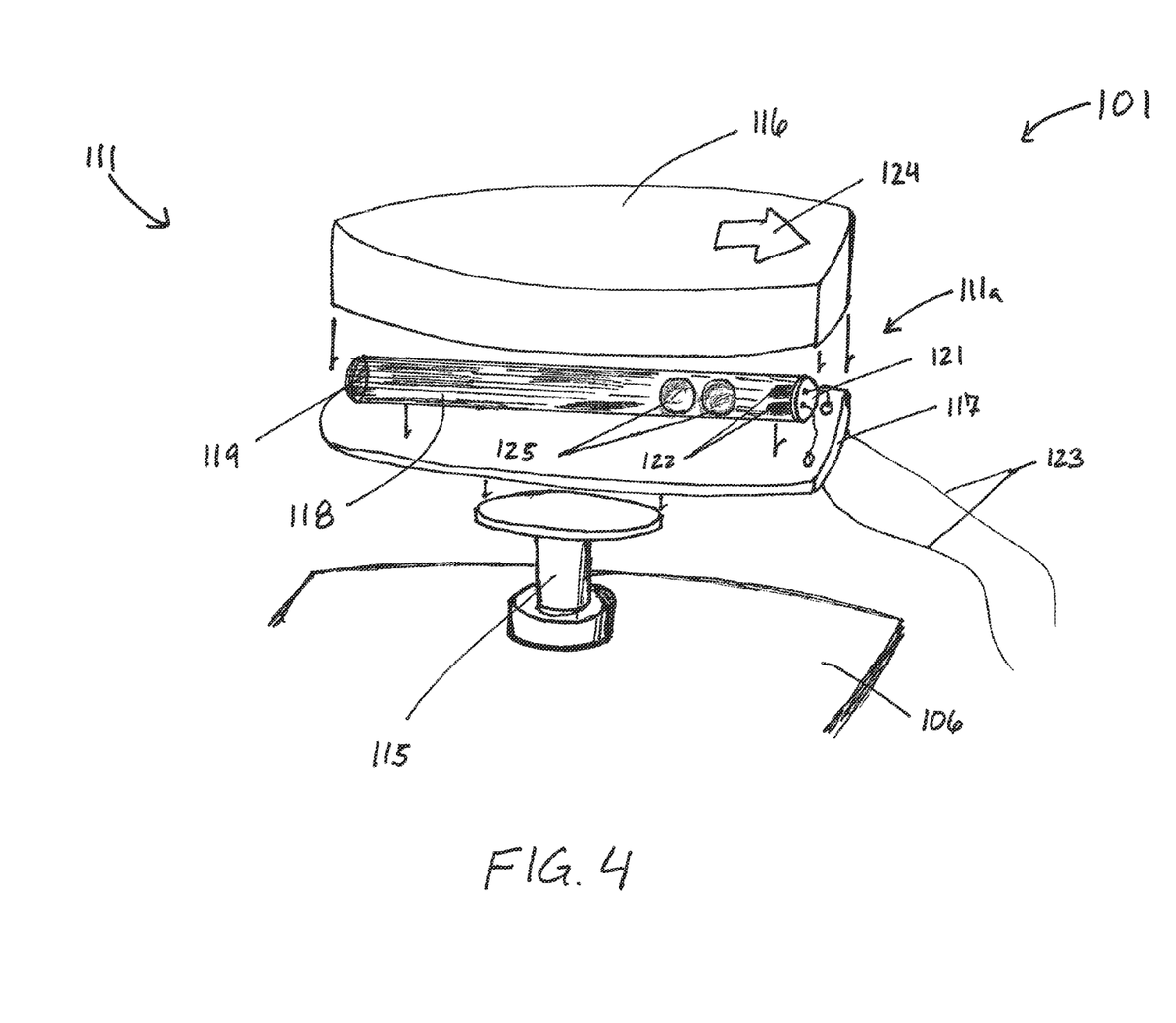
FIG. 4 shows an exploded view of an alternative embodiment of a golf training device.

Turning now to FIG. 4, an exploded view of an alternative embodiment of a golf training device is shown. The embodiment of FIG. 4 is substantially similar to that of FIG. 3, and like elements are numbered the same, but with 100 added thereto. Golf training device 101 includes an alerting device having a motion sensor 111, with a tilt switch 111*a*, supported pivotally by way of a pivot support 115 and attached to a support plate 106. A top encasement 116, with a directional indicator 124, is shown separated from a base 117, for explanatory purposes. Attached to the base 117 is a tube 118, similar to the tube 18, described above, and sealed with a plug 119 at one end. In contrast to the motion sensor 11 with the conductive substance 20, described above, motion sensor 111 includes two conductive roller balls 125, e.g., approximately one cubic centimeter in volume each, that move (e.g., roll or slide) within the tube 118 according to the gravitational and/or inertial forces placed upon them. The conductive roller balls 125 may be formed from gold or may be gold plated to provide conductive surfaces, or may be made of or coated with other sufficiently conductive materials, e.g., copper, silver, etc. A second end of the tube 118 is sealed with a plug 121 with two electrodes 122 which are connected to insulated wires 123. The wires 123 connect the electrodes 122 to power source 12*a* described in FIGS. 1 and 2, which may be mounted and/or attached to or within the support plate 106. The circuit is completed, i.e., a tilt switch is activated, when the conductive roller balls 125 make contact with the electrodes 122, in a similar manner as described with respect to the embodiment shown in FIG. 3.

Although described in the above exemplary embodiments as having a tilt switch using a conductive substance or roller balls, those of ordinary skill in the art will understand that other forms of motion and/or position sensors 11 may be used, such that the motion and/or position of the knee to which the golf training device is equipped may be used to activate the sensor 11, 111 and provide or generate positive feedback only when the optimal position is achieved. In some embodiments, the motion sensor 11, 111 may include, or alternatively be formed from, gyro-inertial sensors, opto-kinetic systems, accelerometers/microprocessors, or other forms of motion/position detecting devices.

The golf training device 1 may be calibrated by a user in the following manner. To calibrate the golf training device 1, 101, the golfer dons the device 1, 101 above the lead knee using the strap 2 and turns it on using switch 14. The golfer then assumes a suggested optimal lead knee position representing the end of the backswing. For example, a user may perform a practice backswing, with the guide of a trainer or other aid. With the lead knee at this optimal position, the motion sensor 11, 111 is moved and oriented, e.g., tilted slowly on the pivot support 15, 115 in the embodiments of FIGS. 3 and 4, until the electrical circuit 50, described in FIG. 2, is completed and the positive feedback alarm 13 alerts. As shown in FIGS. 1, 3, and 4, an arrow 24, 124, or other directional indicator, is positioned on one end of the top encasement 16, 116, to indicate the position or end of the golf training device 1, 101 containing the electrodes 22, 122. This indicator 24, 124 may be used by the golfer to assist in moving/orienting the sensor 11, 111 to the position that will activate the alarm 13 in the optimal position of the lead knee, i.e., the position of the knee in which electrical circuit 50 will be complete and activate the alarm 13.

In the illustrated embodiments, the pivot support 15, 115 allows for accurate movement and adjustment of the position and alignment of the motion sensor 11, 111 during calibration, but is configured to stay in or lock into that calibrated position and not move during the golf swing and movement of the knee. This may be achieved, for example, by providing an adequate friction resistance of the pivot support 15, 115, i.e., in the socket thereof, as will be understood by those of ordinary skill in the art. Alternatively, the sensor 11, 111 may be locked into place with a locking mechanism, such as a screw, pin, or other locking device or means to hold the motion sensor 11, 111 in place, once the calibrated position is achieved.

After the calibrated position is set, when the golfer assumes the address position, the electrical circuit 50 is not completed and the positive feedback alarm 13 does not alert. During the golf swing, when the lead knee moves to the optimal position, the electrical circuit 50 will be completed, and the alarm 13 will activate to indicate to the golfer that the optimal position is reached. This provides positive feedback to the golfer. In the illustrated embodiments, for example, during the swing and consequent movement of the lead knee and thus the motion sensor 11, 111 attached to the golfer's leg, when the optimal position of the golfer's lead knee is reached, the tilt sensor 11a, 111a closes the electrical circuit 50, and the positive feedback alarm 13 activates. Conversely, if the lead knee does not attain the correct position, the alarm 13 will not activate, informing the golfer that he or she did not make the correct swing motion.

Figure 5A:
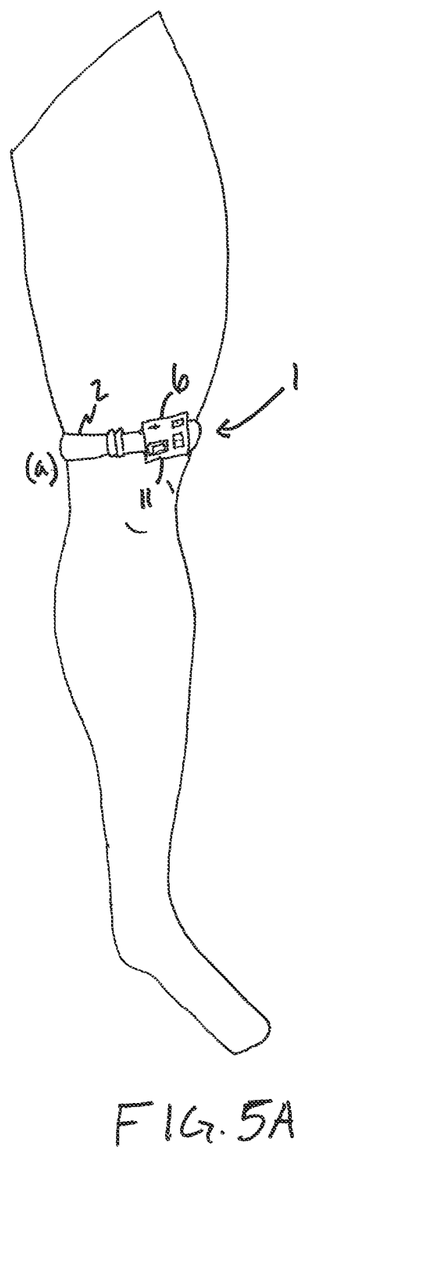
FIG. 5A shows the golf training device of FIG. 1 as worn on the leg of a golfer, showing the front view of a right handed golfer's lead leg position at address.
Figure 5B:
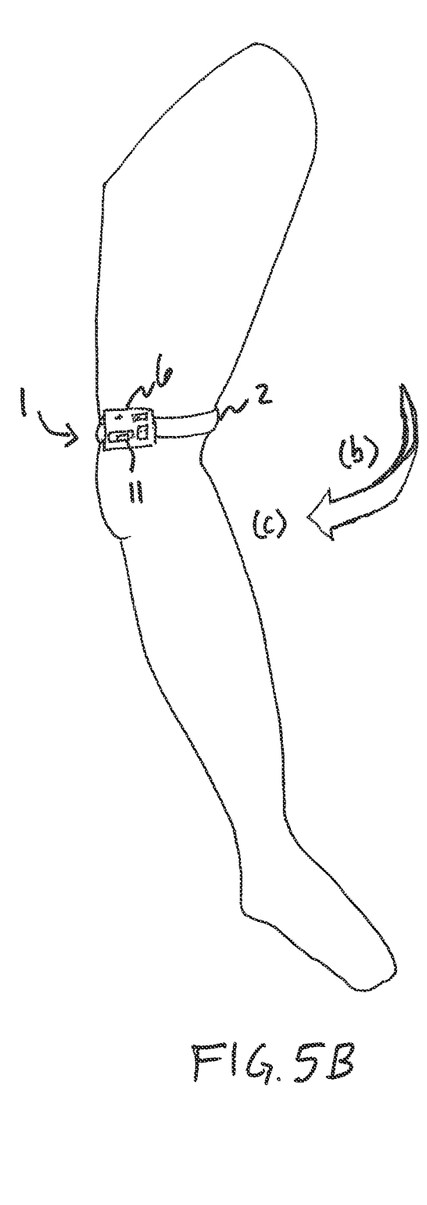
FIG. 5B shows the front view of the device and lead leg of FIG. 5A at the completion of the backswing.

This is demonstrated in FIGS. 5A, 5B, 6A, and 6B. FIG. 5A shows the calibrated golf training device 1 worn on the leg of a golfer, showing the front view of a right-handed golfer's lead leg position at address. FIG. 5B shows the golf training device 1 and lead leg at the completion of the backswing. As shown, the golf training device 1 is secured above the knee of the golfer by way of the strap 2. The device 1 is shown as positioned about one inch above the lead knee, with the support plate 6 and motion sensor 11 attached thereto. Though the device 1 is shown at a certain position on the leg, it can be placed in any position that will adequately detect knee movement, and optimally be positioned to detect the optimal position of the lead knee during a golf swing. Furthermore, consistent placement of the device 1 permits more accurate determination of correct knee movement across different practice/swing sessions.

The backswing motion of the lead knee is represented by the curved arrow, transitioning between FIG. 5A and FIG. 5B. The curved arrow depicts the three-dimensional anatomical motion of the lead knee during the backswing. The lead knee position begins at the point (a), moves through point (b), and ends at point (c). At point (a) the outward movement of the lead knee begins to move toward point (b) in a downward movement and then toward the golfer's trailing knee (not shown) to point (c). The golf training device 1 moves with this three-dimensional motion of the lead knee during the backswing and alerts the golfer when the lead knee reaches the optimal position at point (c), i.e., the electrical circuit 50 is completed at this position of the lead knee.

Figures 6A, 6B:
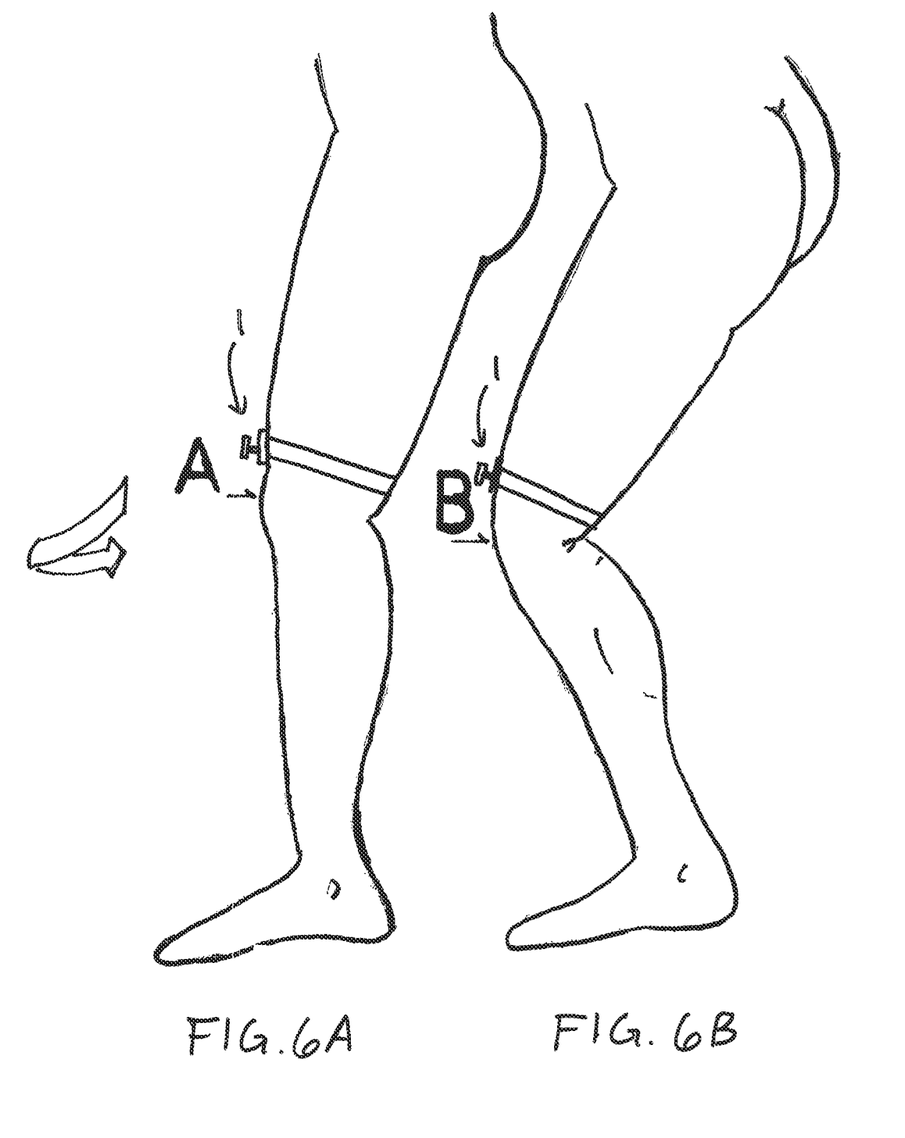
FIG. 6A shows the golf training device of FIG. 1 as worn on the leg of a golfer, showing the side view of a right handed golfer's lead leg position at address.
FIG. 6B shows the side view of the device and lead leg of FIG. 6A at the completion of the backswing.

FIG. 6A shows the golf training device 1 worn on the leg of a golfer, showing the side view of a right-handed golfer's lead leg positioned at address instead of the front view as shown in FIG. 5A. FIG. 6B shows the golf training device 1 and lead leg at the completion of the backswing. The curved arrow in FIG. 6A depicts the three-dimensional anatomical motion of the lead knee during the backswing. Position A depicts the superior point of the lead leg's kneecap at address. Position B, shown in FIG. 6B, depicts the final position of the lead leg's kneecap at the end of the backswing. This illustration depicts that the lead knee at the optimal position (Position B) at the end of the backswing has been lowered from its start position (Position A) at the beginning of the backswing. Anatomically, the lowering of the lead knee during the backswing is a direct result of the flexion and rotation of the knee joint during the backswing.

While the disclosure has been presented with respect to a number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A golf training aid, comprising:
a support;
an alerting device mounted on the support comprising a motion sensor and a positive feedback device; and
an attachment device configured to attach the golf training aid to a leg of a user;
wherein the motion sensor is configured to detect a motion of a user's knee during a golf swing by the user, and when a predetermined position of the user's knee is reached, activate the positive feedback device and generate a positive feedback alert for the user.

2. The golf training aid of claim 1, wherein the motion sensor comprises at least one of a tilt switch, a gyro-inertial sensor, an opto-kinetic system, and an accelerometer.

3. The golf training aid of claim 1, wherein the positive feedback device is electrically activatable, and the alerting device further comprises an electrical power source placeable into electrical communication with the positive feedback device when the predetermined position is reached, thereby providing electrical current to, and activating, the positive feedback device to generate the positive feedback alert.

4. The golf training aid of claim 1, wherein the attachment device comprises a strap having a first end attached to the support and a second end selectively attachable to the support.

5. The golf training aid of claim 1, further comprising a pivot support pivotally mounting the motion sensor to the support, wherein the motion sensor is selectively adjustable on the pivot support between a first position in which the motion sensor does not activate the positive feedback device when the user's knee reaches the predetermined position and a second position in which the motion sensor activates the positive feedback device when the user's knee reaches the predetermined position.

6. The golf training aid of claim 5, wherein the pivot support is configured to maintain the motion sensor in the second position during movement of the user's leg during a golf swing.

7. The golf training aid of claim 1, wherein the alerting device comprises an electrical circuit including an electrical power source and configured to be in an electrically open state when the user's knee is not in the predetermined position, and in an electrically closed state when the user's knee is in the predetermined position, thereby delivering electrical power to and activating the positive feedback device.

8. The golf training aid of claim 1, wherein the positive feedback alert is at least one of an audible alert, a visual alert, and a tactile alert.

9. The golf training aid of claim 1, wherein the positive feedback alert is not activated when the alerting device fails to detect the predetermined position.

10. A method for golf training, comprising:
removably attaching a golf training aid onto the leg of a user, wherein the golf training aid comprises a support, an alerting device mounted on the support comprising a motion sensor and a positive feedback device, and an attachment device configured to attach the golf training aid to a leg of a user, wherein the motion sensor is configured to detect a motion of a user's knee during a golf swing by the user, and when a predetermined position of the user's knee is reached, activate the positive feedback device and generate a positive feedback alert to the user; and
generating a positive feedback alert with the positive feedback device when the user's leg reaches the predetermined position to alert the user thereof.

11. The method of claim 10, wherein the positive feedback device is electrically activatable and the alerting device further comprises an electrical power source placeable into electrical communication with the positive feedback device when the predetermined position is reached, and wherein the alerting step further includes
 placing the electrical power source into electrical communication with the positive feedback device;
 providing electrical current to the positive feedback device;
 activating the positive feedback device; and
 generating the positive feedback alert.

12. The method of claim 11 including providing electrical power to the positive feedback device only when the predetermined position is achieved.

13. The method of claim 10, wherein the generating step comprises generating at least one of an audible alert, a visual alert, and a tactile alert.

14. The method of claim 10, wherein the golf training aid comprises a pivot support pivotally mounting the motion sensor to the support, the motion sensor is selectively adjustable on the pivot support between a first position in which the motion sensor does not activate the positive feedback device when the user's knee reaches the predetermined position and a second position in which the motion sensor activates the positive feedback device when the user's knee reaches the predetermined position, and the method further comprises, after the attaching step, adjusting the motion sensor on the pivot support to the second position.

15. The method of claim 14, further comprising maintaining the motion sensor in the second position during movement of the user's leg during a golf swing.

16. A golf training aid comprising:
 an alerting device comprising first means for detecting a motion of a user's knee during a golf swing by the user, for detecting when a predetermined position of the user's knee has been reached, and for activating second means of the golf training aid for generating a positive feedback alert for the user when the first means detects that the predetermined position of the user's knee has been reached;
 third means for supporting the first and second means mounted thereon; and
 fourth means for removably attaching the golf training aid to a leg of the user.

17. The golf training aid of claim 16, wherein the first means is a motion sensor, the second means is a positive feedback device, the third means is a support, and the fourth means is an attachment device.

18. The golf training aid of claim 16, further comprising fifth means for delivering electrical power to the second means when the first means detects the predetermined position.

19. The golf training aid of claim 17, wherein the fifth means is an electrical circuit including an electrical power source.

20. The golf training aid of claim 16, further comprising sixth means for pivotally mounting the first means to the third means, and for selectively adjusting the first means on the sixth means between a first position in which the first means does not activate the second means when the user's knee reaches the predetermined position and a second position in which the first means activates the second means when the user's knee reaches the predetermined position.

21. The golf training aid of claim 20, wherein the sixth means is a pivot support.

22. The golf training aid of claim 20, wherein the sixth means further includes seventh means for maintaining the sixth means in the second position during movement of the user's leg during a golf swing.

* * * * *